United States Patent [19]

Ueda et al.

[11] Patent Number: 4,866,258

[45] Date of Patent: Sep. 12, 1989

[54] OPTICAL PATTERN DETECTING APPARATUS

[75] Inventors: Shuji Ueda, Neyagawa; Chiuji Shibuya, Katano; Takashi Kanehisa, Osaka; Kenji Fujishiro, Hirakata; Shoro Mochida, Hirakata, all of Japan

[73] Assignee: Matsushita Electric Industrial Co., Ltd., Kadoma, Japan

[21] Appl. No.: 216,484

[22] Filed: Jul. 8, 1988

[30] Foreign Application Priority Data

Jul. 10, 1987 [JP] Japan .............................. 62-173202

[51] Int. Cl.$^4$ ............................................. G06K 7/10
[52] U.S. Cl. .................................... 235/472; 235/462
[58] Field of Search ................. 235/462, 472; 250/566

[56] References Cited

U.S. PATENT DOCUMENTS 3,784,794  1/1974  Allais ................................... 235/472

Primary Examiner—Harold I. Pitts
Attorney, Agent, or Firm—Cushman, Darby & Cushman

[57] ABSTRACT

An optical pattern detecting apparatus has a ball lens (2), a light emitting device such as LED (3) and a light receptor such as photodiode (4), the latter two (3, 4) being disposed side-by-side with their optical axis substantially in parallel so that light from the light emitting device (3) passes is converged by the ball lens (2) onto barcode mark (7) and light reflected from said barcode mark (7) is guided by the same ball lens (2) to the light receptor (4); and by use of the ball lens, the apparatus can stably detect the barcode mark even at inclination of the apparatus to the surface of the barcode mark.

8 Claims, 4 Drawing Sheets

OPTICAL PATTERN DETECTING APPARATUS

FIELD OF THE INVENTION AND RELATED ART STATEMENT

1. Field of the Invention

The present invention relates to an optical pattern detecting apparatus for detecting a barcode for identifying a commodity printed by or affixed to the commodity, a barcode for recognizing the data for reservation of a TV program in the video tape recording program system and various other patterns recognition apparatuses.

2. Description of the Related Art

In recent years, in product shipping sections in factories, department stores and the like, a barcode system has been widely adopted. In the system, a seal or the like indicating a barcode is affixed to or directly printed on a packing box or the like, to identify a large quantity of commodities. And the barcode is read optically to perform controls of going-in and -out and stocks of commodities. Besides, in the case of recording a TV program, a system begins to be employed which makes reservation processing by optically reading the barcode of a program from a barcoded table of stations or channels, the dates and the like, to reserve in advance the program desired to be recorded.

Various barcode sensors are employed for reading such barcodes, and among them, for a pen-type sensor for reading still barcodes while held by hand and moved on the barcode surface. A barcode sensor as shown in FIG. 5 has been known so far.

FIG. 5 shows a conventional barcode sensor, wherein a casing 11, there provided LED 12 as a light source, optical fibers 13 for transmitting light from the LED 12 to a tip reading part 14 of the casing 11. A read hole 15 is formed at the center of the tip reading part 14 for introducing light reflected on the barcode surface. A convex lens 16, a light stop 17 and an aperture 18 are provided between a photoreceptor 19, such as in phototransistor and the read hole 15. The photoreceptor 15 receives the light condensed in the aperture 18 and converts it into an electric signal and gives it to an amplifier 20 wherefrom output signal is issued.

Light from the LED 12 is irradiated from the tip reading part 14 onto the barcode surface through the optical fibers 13. Light signal based on high level and low level of the reflected light caused by the white portion and the black portion of the barcode is introduced through the read hole 15, travels through the convex lens 16, the stop 17 and the aperture 18, and is detected by the photoreceptor 19. The output signal of the above-mentioned amplifier 20 is shaped into accurate pulse signals by waveform shaping circuit, and is inputted to a microcomputer, and the content of the barcode is decoded.

In the above-mentioned conventional constitution, light from the LED 12 is introduced into the optical fibers 13 and the light is irradiated without lens onto the barcode surface to form a spot light. Therefore, the efficiency of condensing light is low, and thereby a satisfactory quantity of light is not obtainable, and the length of light path is long. Thereby, the size of the apparatus becomes large, and expensive parts such as optical fibers are required. Resultantly, the number of parts becomes large, and the cost becomes high including the cost required for assembling and adjustment increases. Besides, a detection error is liable to be produced due to inclination from the posture of normal to the barcode surface, and thereby the operability is poor.

OBJECT AND SUMMARY OF THE INVENTION

In light of the above-mentioned conventional problems, the present invention purposes to provide an optical pattern detecting apparatus of small-sized and simple constitution, which can be fabricated at a low cost, and has a good operability.

The optical pattern detecting apparatus in accordance with the present invention comprises:

a light emitting device, a photoreceptor, a common lens which condenses light irradiated from the light emitting device onto a surface having a pattern and further guides light reflected from the surface to the photoreceptor, and a common light stop installed between the light emitting device and the lens, as well as, between the photoreceptor and the lens.

In addition, the above-mentioned light source part is preferably constituted with the light emitting device and a cylindrical reflecting surface installed in front of it.

According to the optical pattern detecting apparatus of the present invention, since the light irradiated from the light emitting device travels through the light stop, and is converged by the ball lens and is irradiated in a spot shape onto the pattern detecting surface, a satisfactory amount of light is obtainable, and the diameter of the spot can be set to a required uniform value by means of the light stop. Therefore a high resolution can be secured. Also, since the reflected light is received by the photoreceptor through the same ball lens and the same light stop, a simple and compact constitution is made with the light emitting device, and photoreceptor, the light stop and the ball lens. Thereby, a small-sized and economical detecting apparatus is provided. Furthermore, since the light is condensed in a spot shape by the ball lens, a detection error is hard to be produced even if the apparatus is inclined from the state that light axis of the apparatus is normal to the pattern detecting surface. Thereby, the operability can be much improved.

In addition, by installing a cylindrical reflecting surface in the light source part, the distribution of light quantity on the light emitting surface of the light emitting device can be properly adjusted.

BRIEF DESCRIPTION OF THE DRAWINGS

FIG. 1 through FIG. 4 show a preferred embodiment in accordance with the present invention wherein:

FIG. 1 is a plan view showing a casing with the upper half thereof removed.

FIG. 2 is a perspective view showing the casing at a state before attaching the upper half thereof.

FIG. 3 is a perspective view showing a light emitting device.

FIG. 4 is a graph of a distribution of the light quantity of a light source.

DESCRIPTION OF THE PREFERRED EMBODIMENT

Figure 1:
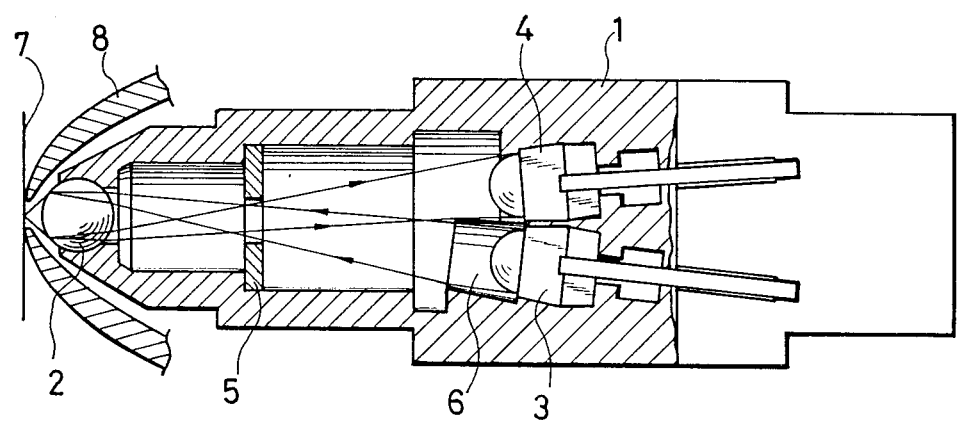
Figure 2:
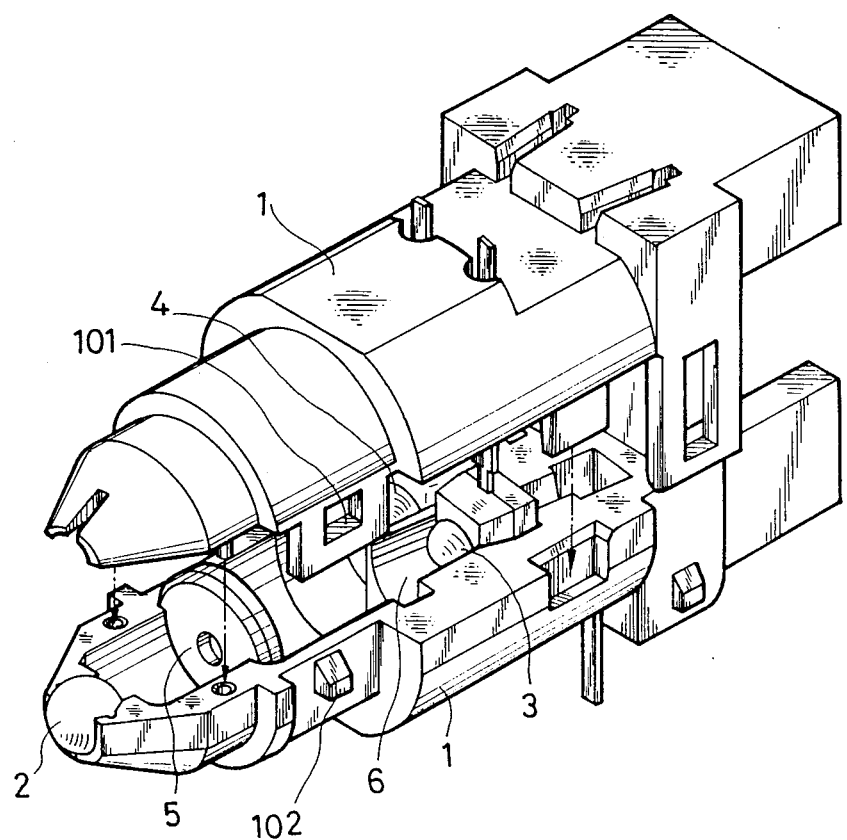

Hereinafter, description is made on a preferred embodiment in accordance with the present invention based on FIG. 1 through FIG. 4.

A casing 1, for instance, of plastic mold consists of two half parts to be bonded at the plane including the center-axis, and the both half parts are connected by a disengageable engagement means 101, 102. A ball lens 2 is disposed at one end in the center-axial direction of this casing 1, and a light emitting device such as LED 3 and a photoreceptor such as a photodiode such as a photodiode 4 are disposed apart by a proper distance from this ball lens 2 with their optical axes in substantially parallel relation to and on both sides of the center-axis of the casing 1. Then, a light stop 5 is disposed at a proper position between the ball lens 2 and the light emitting device 3 and the photoreceptor 4 in a manner concentric with the center-axis of the casing 1. In front of the light emitting device 3, a cylindrical reflecting surface 6 is formed in a manner that the outer periphery of the light emitting device 3 is extended in the center-axial direction.

The relative arrangement of the light emitting device 3, the photoreceptor 4, the light stop 5 and the ball lens 2 of the embodiment is set in a manner that: among the light irradiated from the light emitting device 3, the rays passing through the light stop 5 reaches the ball lens 2, and is condensed on a pattern detecting surface 7 which is located with a predetermined gap, for example, 0.5 mm from the ball lens 2 on the center-axis of the casing 1. Further, the diameter of hole of the light stop 5 is set so that the diameter of the spot light on the pattern detecting surface becomes about 200 µm.

In addition, the apparatus is constituted in a manner that the outside of the casing 1 is covered with a covering sheath 8, so that the tip portion of this sheath 8 is to be slided along over the pattern detecting surface 7. Thereby, the interval between the ball lens 2 and the pattern detecting surface 7 is kept at the above-mentioned predetermined value. The outer surface of the tip portion is formed in such a spherical shape that the spot light does not deviate largely from the pattern detecting surface 7, even if the apparatus is inclined to the normal of the pattern detecting surface 7.

Figure 3:
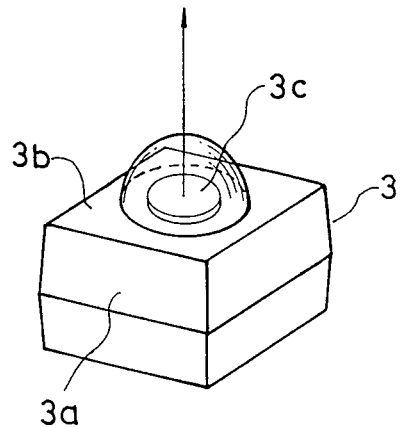
Figure 4:
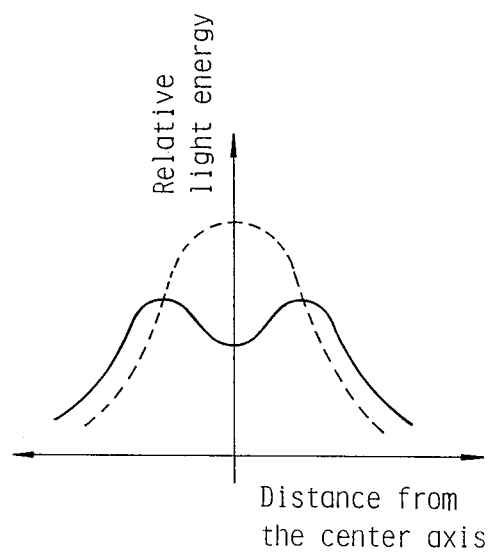
Figure 5:
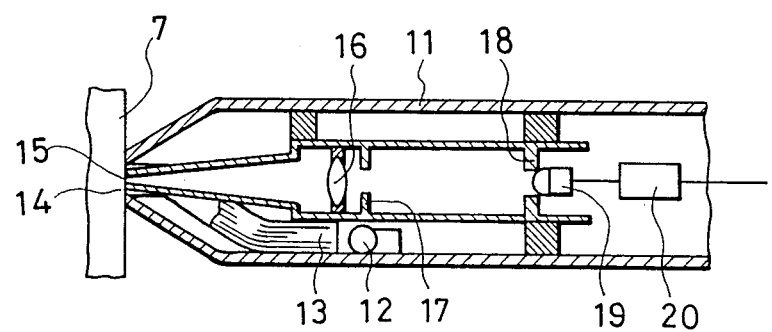
FIG. 5 is the longitudinal sectional plan view of the conventional apparatus.

Next, description is made on the operation of the above-mentioned embodiment. On a chip 3a of the light emitting device 3, as shown in FIG. 3, an electrode 3c is formed at and covering the center portion of a light emitting surface 3b. Therefore, the distribution of light irradiated from this light emitting device 3 has a dip at the center portion as shown by a full line curve in FIG. 4. However, in the above-mentioned constitution, the light irradiated onto the periphery is reflected by the cylindrical reflecting surface 6 installed in front of the light emitting diode 3, and hence is condensed on the center portion. Therefore, as shown by a broken line curve in FIG. 4, such a satisfactory distribution of light quantity is obtained that the light quantity of the center portion is maximum. The component of light, which is irradiated from the light emitting device 3 but is adjusted of its distribution of light quantity by the cylindrical reflecting surface 6 around the light path, further is limited by the light stop 5 and then reaches the ball lens 2. Such adjusted and limited light beam is irradiated in a spot of uniform light distribution on the pattern detecting surface 7 at the position facing the center-axis of the casing 1. Since this spot light is set to about 200 µm as mentioned above, a detection with high resolution can be performed. The light is reflected from the pattern detecting surface 7 and travels along a light path which is in symmetry to the light path of the above-mentioned irradiated light with respect to the center-axis of the casing 1. The reflected light is finally received by the photoreceptor 4 through the ball lens 2 and the light stop 5. Then, a change of quantity of the reflected light due to a barcode or the like pattern is detected by this photoreceptor 4, and is converted into an electric signal. Thereby, the information of the pattern is read from the electric signal.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An optical pattern detecting apparatus comprising a light emitting device,
a photoreceptor,
a common lens which condenses light irradiated from said light emitting device onto a surface having a pattern and further guides light reflected from said surface to said photoreceptor, and
a common light stop installed between said light emitting device and said lens, as well as, between said photoreceptor and said lens.

2. An optical pattern detecting apparatus in accordance with claim 1, characterized in that the light emitting device and the photoreceptor are arranged substantially in parallel direction to the optical axis of the common lens.

3. An optical pattern detecting apparatus in accordance with claim 1, wherein the common lens is a ball lens.

4. An optical pattern detecting apparatus in accordance with claim 1, wherein a substantially cylindrical reflection surface is provided around a light path between the light emitting device and the light stop.

5. An optical pattern detecting apparatus comprising:
a light unit comprising a light emitting device as a light source and a photoreceptor disposed with their optical axis substantially in parallel,
a lens for condensing light irradiated from said light emitting device onto a barcode surface and also for guiding the light reflected from the barcode surface to said photoreceptor, and
a light stop disposed between said light emitting devices and said lens and between said lens and said photoreceptor.

6. An optical pattern detecting apparatus in accordance with claim 1 or 5, wherein said light stop is installed at a point of cross-over of the optical axis of the irradiation path of emitted light and the optical axis of the reception path of reflected light.

7. An optical pattern detecting apparatus in accordance with claim 1 or 5, wherein said light stop is installed at a position on a line connecting a center of said lens and a center between said light emitting device and said light receptor.

8. An optical pattern detecting apparatus in accordance with claim 1, wherein a substantially cylindrical reflection surface is provided around a light path between the light emitting device and the light stop.

* * * * *